W. DIETER.
BRAKE MECHANISM FOR MOTOR CARS.
APPLICATION FILED JAN. 30, 1920.
1,347,736.
Patented July 27, 1920.
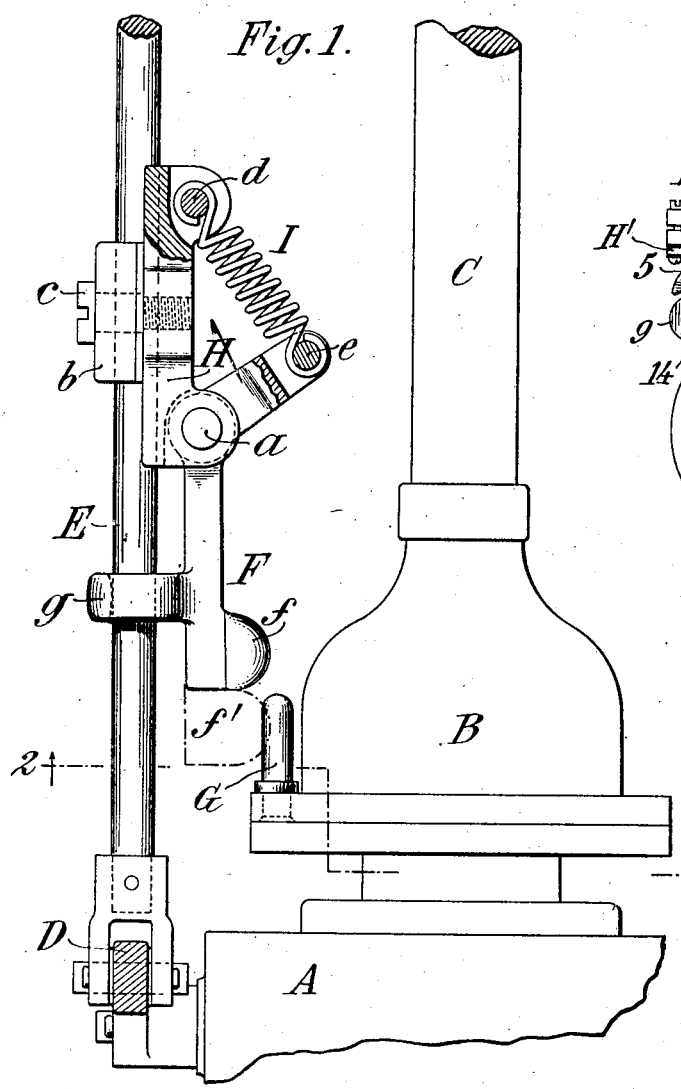
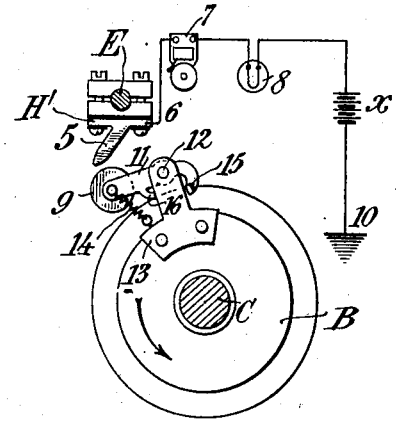
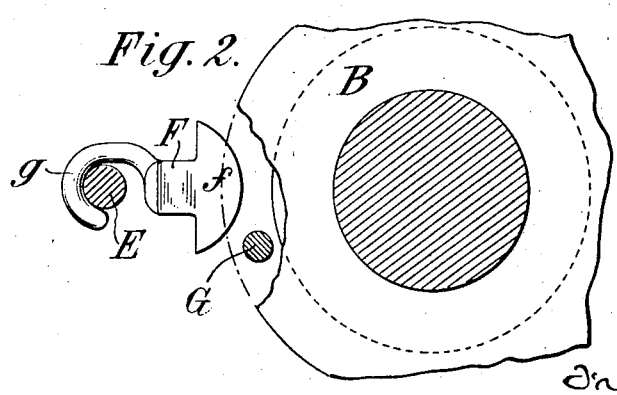
INVENTOR
William Dieter,
By Attorneys,
Fraser, Durk & Myers

UNITED STATES PATENT OFFICE.

WILLIAM DIETER, OF BROOKLYN, NEW YORK.

BRAKE MECHANISM FOR MOTOR-CARS.

1,347,736.

Specification of Letters Patent.

Patented July 27, 1920.

Application filed January 30, 1920. Serial No. 355,212.

*To all whom it may concern:*

Be it known that I, WILLIAM DIETER, a citizen of the United States of America, residing in the borough of Brooklyn, county of Kings, city and State of New York, have invented certain new and useful Improvements in Brake Mechanism for Motor-Cars, of which the following is a specification.

This invention relates to brake mechanism for motor cars, its object being to provide against the car being run with the brake on, when the brake action is not required. Motor vehicles are commonly provided with a service brake operated by the foot and a so-called emergency brake operated by the hand, the principal use of the latter being to hold the car against accidental starting when standing still. It often happens that an operator will start up a car without releasing the hand brake, and run it for a considerable time without observing that the brake is still applied; this not only wastes power but what is more important is liable to burn out or destroy the brake lining. The present invention provides a means for bringing to the attention of the operator the fact that the hand-brake is applied while the car is running, so that he may not forget to release this brake.

To this end the invention provides an alarm device or annunciator adapted to make a noise or otherwise to impress the attention of the operator; and provides means for putting such device into operative condition when the brake is applied, so that if the car be running at such time, the alarm will be given and continued until either the brake is released or the car is stopped.

The accompanying drawings show two embodiments of the invention,—

Figure 1 is a fragmentary plan view, partly in section, showing a mechanically actuated alarm device and its coacting parts of the motor and brake mechanism.

Fig. 2 is a vertical transverse section thereof on the line 2—2 in Fig. 1.

Fig. 3 shows an electrical alarm device, the view being a transverse section corresponding to Fig. 2 with the addition of a diagrammatic illustration of the electrical circuit connections.

In Fig. 1 A designates the usual box or casing for the speed change gearing, B a usual form of universal joint, C the propeller shaft leading thence aft to the usual differential gear for driving the rear axle, D the hand-brake lever and E the brake-rod actuated thereby. These parts are all of a usual and well known construction and may be substitute by any other known construction of these or corresponding parts of motor cars, either pleasure vehicles or trucks.

The alarm device consists of a spring-actuated vibrator F in the nature of a hammer and a cam G for actuating it. The construction shown in Figs. 1 and 2 is very simple. The part F is a lever pivoted at $a$ to a plate H which is fastened in any suitable manner to the brake-rod E as by a clamping plate $b$ and screws $c$. A spring I is connected at $d$ to the plate H and at $e$ to a short arm of the lever F. The lever F has a cam face $f$ adapted to be displaced by the passage of the cam G in either direction, so that the car may be run either forward or backward. The lever F has a stop and tappet arm $g$ which may partly or wholly embrace the brake-rod E (or any other suitable part) so that it serves to limit the movement of the lever F under the stress of the spring. When the brake is off, the parts are in the positions shown in full lines in Fig. 1, the cam $f$ being wholly to the rear of the operating cam G. This is the condition of normal running with the hand-brake released. When the hand-brake is applied, its rod E is moved forward, thereby bringing the cam end $f$ of the lever F into the position shown in dotted lines at $f'$, where it stands in the plane of movement of the cam G and projecting partly into the path of movement thereof, so that if the car be running the cam G in passing displaces the cam end or head $f$ of the lever F against the stress of the spring and in so doing lifts the tappet arm $g$ away from the rod E. Instantly upon the passage of the cam G the spring I causes the lever F to fly back and its tappet $g$ strikes a blow against the rod E. The spring is of such stress and the parts are so proportioned that this blow is clearly audible, and in the normal running of the car it is repeated once to each rotation of the propeller shaft (or oftener if more than one cam G is used), so that a succession of tapping or hammering noises are made such as must necessarily be noticed by the operator who is thereby informed that he is running his car with the brake on.

The cam G is shown as a simple round pin tapped into a flange of the universal joint B, in order to enable the device to be readily applied to existing cars. The alarm device is also easily applied to existing cars, since the tappet arm $g$ may be hooked over the brake-rod and the parts H $b$ be applied and clamped to the brake-rod from opposite sides. Generally no adjustment will be required, it being possible with most existing makes of cars to so locate the cam pin G as to properly coact with the cam head $f$ of the alarm lever.

In the embodiment shown in Fig. 3 an electrical alarm is used. On the brake-rod E (or any part connected therewith) is mounted a circuit-closing contact 5 connected in a circuit 6 which includes an alarm bell 7, a lamp 8 and a battery or generator $x$ and terminates in connection with an opposite circuit closer 9 carried by any suitable moving part of the car, as for example, the shaft C or universal joint B, or one of the wheels. The circuit connection with the terminal 9 may be a ground connection with the main frame or bearings of the car as denoted at 10. The contact 5 is connected by a plate H' to the brake-rod in a similar manner to the construction shown in Fig. 1, so that when the brake is on the contact 5 will be in position to be touched by the contact 9. The contact 9 is shown as a disk mounted on an arm 11 pivoted at 12 to an arm on a plate 13 which is suitably fastened to the revolving part, whereby the contact 9 is caused at each revolution to make contact with the terminal 5 if the latter is in the position of application of the brake, so that the circuit is closed and the alarm bell 7 is caused to ring. To prevent possible injury to the generator, if the car were to start with the circuit closed, the contact 9 is given a centrifugal action, moving out to touch the contact 5 when rotating, and drawn in by a spring 14 when at rest; the outward and inward movements may be limited by stops 15 and 16.

The result with this construction is the same as in that first described, except that the alarm is given by the striking of a bell, or flashing of a light, (either or both) instead of by the blows of a tappet. Any other suitable kind of alarm device is within the invention, whether the alarm be audible, visual or otherwise. Hence in this specification the term "alarm device" is used in its broadest sense.

The invention may be otherwise modified, it being only essential that the connection with the brake mechanism shall be such that when the brake is off the alarm shall be inoperative, and when the brake is on the alarm shall be actuated by the running of the car. With the constructions shown the engine may be idled without actuating the alarm.

If it becomes necessary to use the handbrake as an emergency brake in ordinary running, the alarm will, of course, be given, but as such use of the emergency brake is extremely rare, the disadvantage thereof is negligible.

What I claim is:—

1. In a motor car, the combination with a revolving part thereof and a brake, of an alarm device operatively connected with the brake and adapted, when the brake is applied, to be actuated by said revolving part to give an alarm to the driver when the car is running with the brake applied.

2. Mechanism according to claim 1, comprising an actuating member carried by said revolving part and a reciprocal member connected with the brake and movable thereby into or out of operative engagement with said actuating member according as the brake is on or off.

3. Mechanism according to claim 1, including an actuating member on said revolving part, and a member of the alarm connected with the brake and movable thereby into or out of the path of said actuating member according as the brake is on or off.

4. Mechanism according to claim 1, comprising a cam carried by said revolving part, and an actuated member of the alarm displaceable by said cam, and connected with the brake to be moved into or out of the path of the cam according as the brake is on or off.

5. A brake alarm for warning the driver of a motor car when running with the brake applied comprising a cam carried by a revolving part and an alarm device connected to a brake member and movable thereby into or out of engagement with said cam.

6. A brake alarm for warning the driver of a motor car when running with the brake applied comprising a cam carried by a revolving part and an alarm device carried by a brake rod, and comprising a spring-actuated part having a member engaged by said cam and a stop member adapted when displaced and released to strike a related part and thereby give an alarm.

7. A brake alarm for warning the driver of a motor car when running with the brake applied comprising a cam carried by a revolving part, and an alarm device carried by a brake rod and consisting of a spring-pressed lever having a portion engaged by said cam to displace the lever, and a tappet portion adapted to strike against said rod when released and thereby give an alarm.

In witness whereof, I have hereunto signed my name.

WILLIAM DIETER.